US010464851B2

(12) United States Patent
Gehrig et al.

(10) Patent No.: US 10,464,851 B2
(45) Date of Patent: Nov. 5, 2019

(54) METHOD FOR TREATING GYPSUM

(71) Applicant: BASF Construction Solutions GmbH, Trostberg (DE)

(72) Inventors: Uwe Gehrig, St. Georgen (DE); Klaus Möller, Mutterstadt (DE); Michael Schinabeck, Altenmarkt (DE); Martin Pichler, Trostberg (DE); Joachim Pakusch, Speyer (DE); Ekkehard Jahns, Weinheim (DE)

(73) Assignee: BASF Construction Solutions GmbH, Trostberg (DE)

( * ) Notice: Subject to any disclaimer, the term of this patent is extended or adjusted under 35 U.S.C. 154(b) by 11 days.

(21) Appl. No.: 14/763,025

(22) PCT Filed: Apr. 25, 2014

(86) PCT No.: PCT/EP2014/058474
§ 371 (c)(1),
(2) Date: Jul. 23, 2015

(87) PCT Pub. No.: WO2014/174086
PCT Pub. Date: Oct. 30, 2014

(65) Prior Publication Data
US 2015/0368164 A1 Dec. 24, 2015

(30) Foreign Application Priority Data
Apr. 26, 2013 (EP) .................... 13165467

(51) Int. Cl.
*C04B 38/10* (2006.01)
*C04B 28/14* (2006.01)
*C04B 24/00* (2006.01)
*C04B 24/04* (2006.01)
*C04B 38/00* (2006.01)
C04B 103/65 (2006.01)
C04B 111/00 (2006.01)
C04B 111/27 (2006.01)

(52) U.S. Cl.
CPC .......... *C04B 38/106* (2013.01); *C04B 24/008* (2013.01); *C04B 24/045* (2013.01); *C04B 28/14* (2013.01); *C04B 38/0067* (2013.01); C04B 2103/65 (2013.01); C04B 2111/0062 (2013.01); C04B 2111/27 (2013.01)

(58) Field of Classification Search
None
See application file for complete search history.

(56) References Cited

U.S. PATENT DOCUMENTS

| | | | |
|---|---|---|---|
| 3,455,710 A | 7/1969 | Nitzsche et al. | |
| 3,935,021 A | 1/1976 | Greve et al. | |
| 4,470,877 A * | 9/1984 | Johnstone | D21H 11/04 156/39 |
| 5,366,810 A | 11/1994 | Merrifield et al. | |
| 5,437,722 A | 8/1995 | Borenstein | |
| 5,618,627 A | 4/1997 | Merrifield et al. | |
| 5,814,411 A | 9/1998 | Merrifield et al. | |
| 6,159,339 A | 12/2000 | Hassler et al. | |
| 6,676,745 B2 | 1/2004 | Merkley et al. | |
| 7,815,841 B2 | 10/2010 | Merkley et al. | |
| 8,741,056 B2 | 6/2014 | Meyer et al. | |
| 2009/0194004 A1 | 8/2009 | Meyer et al. | |
| 2010/0116406 A1 | 5/2010 | Mahoney et al. | |
| 2011/0003925 A1 * | 1/2011 | Hauk | C04B 24/085 524/399 |
| 2012/0171505 A1 * | 7/2012 | Rohlf | A01N 33/12 428/537.5 |
| 2014/0245928 A1 | 9/2014 | Meyer et al. | |
| 2016/0031761 A1 * | 2/2016 | Munie | E04C 2/04 106/678 |

FOREIGN PATENT DOCUMENTS

| | | |
|---|---|---|
| DE | 12 23 287 B | 8/1996 |
| DE | 196 10 995 A1 | 9/1997 |
| DE | 10 2005 035 515 A1 | 2/2007 |
| WO | 99/35103 A1 | 7/1999 |
| WO | 00/063294 A1 | 10/2000 |
| WO | 02/28795 A2 | 4/2002 |
| WO | 2010/053494 A1 | 5/2010 |
| WO | 2010/112197 A1 | 10/2010 |

* cited by examiner

*Primary Examiner* — Yun Qian
(74) *Attorney, Agent, or Firm* — Oblon, McClelland, Maier & Neustadt, L.L.P.

(57) ABSTRACT

The present invention relates to a method for producing a gypsum-containing foamed prefabricated building material and to a gypsum-containing foamed prefabricated building material.

10 Claims, No Drawings

METHOD FOR TREATING GYPSUM

This application is a § 371 of International Application No. PCT/EP2014/058474 filed Apr. 25, 2014, and claims priority from European Patent Application No. 13165467.5 filed Apr. 26, 2013.

The present invention relates to a method for producing a gypsum-containing foamed prefabricated building material and to a gypsum-containing foamed prefabricated building material obtainable by this method.

The construction industry uses a host of different gypsum-containing building materials. The gypsum-containing building materials include gypsums, such as lump gypsums (stucco gypsums), mortar gypsums, machine gypsum plasters, plastering gypsums, adhesion gypsums, jointing gypsums, filling gypsums, stucco gypsums, insulating gypsums, flooring gypsums, ready-mixed plaster gypsums, and imitation marbles. The gypsum-containing building materials further comprise gypsum-containing ready-made structural components, such as gypsum plasterboard panels, gypsum fiberboard panels, gypsum-containing wallboarding panels, insulating gypsum panels, gypsum bricks and gypsum-containing moldings.

Many gypsum-containing building materials have only limited stability on exposure to water. This limited stability is attributable to the water-solubility of the set gypsum. In the outdoor sector, therefore, gypsum is used in impregnated form. In the interior sector, in wet enclosed areas, such as bathrooms or cellars, other building materials are preferentially used.

Industrially, the stability of gypsum-containing building materials with respect to water is increased by hydrophobization. This involves the gypsum-containing building material or its surface being treated with a hydrophobizing agent. Hydrophobizing agents described have included wax emulsions (WO 2010/053494), which may additionally comprise polyvinyl alcohol (US 2010/0116406 A1, U.S. Pat. Nos. 3,935,021, 5,437,722) or styrene-(meth)acrylic acid copolymers (WO 00/63294 A1) or combinations of anionic and nonionic surface-active substances (WO 99/35103 A1). Also described as hydrophobizing agents have been water-repellent organosilicon compounds (DE 1223287, U.S. Pat. No. 5,814,411).

Methods for the targeted hydrophobizing of the fiber materials incorporated into gypsum-containing ready-made structural components have also been disclosed. Hydrophobizing agents described in this context have included, in WO 2010/112197, in particular ketene dimers, alkylsuccinic or alkylenesuccinic acid derivatives, polymer-based sizes, alums, and organosilicon compounds, and, in WO 02/28795, in particular, ketene dimers, alkenylsuccinic anhydrides, and stearic acids. According to U.S. Pat. No. 4,470,877, an alkylketene dimer is used as an internal sizing agent for gypsum board paper filled with calcium sulfate dihydrate.

The agents described in the prior art have disadvantages. For instance, certain hydrophobizing agents are not meterable, such as waxes, while others are sensitive to leaching, such as fatty acid derivatives. Anhydrite-bound building materials for façades are rendered hydrophobic using fatty acid salts such as oleates or stearates in powder form. Under the influence of driving rain and frost, in particular, however, the fatty acid salts are leached and broken down.

If a large quantity of hydrophobizing agent has to be added to gypsum in order to set the desired hydrophobicity, this may adversely affect other product properties, such as the strength. The desired hydrophobicity can then not be set independently of other product properties.

The methods known from the prior art are not satisfying for hydrophobizing prior art foamed prefabricated building materials and making them water-resistant. Waxes have to be used in high dilutions and high amounts whereas siloxanes in general exhibit defoaming action with the consequence that the pore structure of the foam may be adversely influenced.

The object, on which the present invention is based, therefore, is that of providing a method for producing a gypsum-containing foamed prefabricated building material that exhibits increased hydrophobicity. A further object on which the present invention is based is that of providing a method for producing a gypsum-containing foamed prefabricated building material that allows an increase in the hydrophobicity using minimal amounts of hydrophobizing agent. Another object on which the present invention is based is that of providing a gypsum-containing foamed prefabricated building material which on exposure to moisture adsorbs only small amounts of water. Further, the method should be simple and should not require a change in the process parameters. Another object of the present invention is to provide a hydrophobized gypsum-containing foamed prefabricated building material which possesses high strength.

Surprisingly it has been found that these objects are achieved by a method for producing a gypsum-containing foamed prefabricated building material (a gypsum-containing foamed ready-made structural component) by contacting gypsum hemihydrate or anhydrite with a ketene dimer.

The invention therefore relates to a method for producing a gypsum-containing foamed prefabricated building material (a gypsum-containing foamed ready-made structural component). Embodiments of the invention are as follows:

1. A method for producing a gypsum-containing foamed prefabricated building material comprising
    (a) preparing a mixture of gypsum hemihydrate or anhydrite, a ketene dimer of the formula (I)

and/or of the formula (II)

in which $R^1$ and $R^2$ are identical or different hydrocarbon radicals comprising 12 to 24 carbon atoms, and an aqueous foam to obtain a gypsum composition; and
    (b) forming, optionally curing and drying the gypsum composition to obtain the foamed prefabricated building material.

2. The method according to embodiment 1, wherein the hydrocarbon radicals are selected from branched and unbranched $C_{12}$-$C_{24}$-alkyl or $C_{12}$-$C_{24}$-alkenyl.

3. The method according to embodiment 1 or 2, wherein the hydrocarbon radicals are selected from branched and unbranched $C_{12}$-$C_{24}$-alkyl, more particularly branched and unbranched $C_{14}$-$C_{20}$-alkyl, and more preferably branched and unbranched $C_{16}$-$C_{18}$-alkyl, such as branched and unbranched $C_{16}$-alkyl and branched and unbranched $C_{18}$-alkyl.

4. The method according to any of the preceding embodiments, wherein the ketene dimer is employed in the form of an aqueous dispersion (ketene dimer dispersion).

5. The method according to embodiment 4, wherein the gypsum hemihydrate or anhydrite is employed in solid form or in the form of an aqueous suspension.

6. The method according to embodiment 4 or 5, wherein the ketene dimer dispersion is stabilized by a protective colloid.

7. The method according to embodiment 6, wherein the protective colloid is anionic, cationic or amphoteric.

8. The method according to embodiment 6 or 7, wherein the protective colloid is selected from synthetic, natural, and modified natural polymers.

9. The method according to any of embodiments 6 to 8, wherein the protective colloid is a nonionic, anionic, or cationic polysaccharide, the anionic polysaccharide being modified by carboxyl groups and the cationic polysaccharide being modified by ammonium structural units.

10. The method according to embodiment 9, wherein the protective colloid is a starch or a cellulose.

11. The method according to embodiment 10, wherein the protective colloid is a potato starch, tapioca starch, rice starch, wheat starch, corn starch, waxy corn starch, sorghum starch and/or pea starch which is modified by ammonium structural units.

12. The method according to embodiment 10, wherein the protective colloid is a cellulose modified by ammonium structural units.

13. The method according to any of embodiments 9 to 12, wherein the ammonium structural units are identical or different and conform to the formula (IIIa) and/or to the formula (IIIb)

  (IIIa)

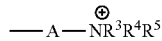  (IIIb)

in which
A is branched or unbranched $C_1$-$C_4$-alkylene which is optionally substituted by one or more hydroxyl or phenyl groups; or
A is $C_1$-$C_3$-alkylene-phenylene, phenylene-$C_1$-$C_3$-alkylene, or $C_1$-$C_3$-alkylene-phenylene-$C_1$-$C_3$-alkylene which is optionally substituted by one or more hydroxyl groups; and
$R^3$, $R^4$, and $R^5$ independently of one another are branched or unbranched $C_1$-$C_4$-alkyl or $C_2$-$C_4$-hydroxyalkyl, it also being possible for $R^5$ to be H.

14. The method according to embodiment 13, wherein the ammonium structural units are identical or different and conform to the formula (IIIb) in which
A is —$CH_2$—CHOH—$CH_2$—, —$CH_2$—CH($CH_2$OH)—, or —$CH_2$—$CH_2$—; and
$R^3$, $R^4$, and $R^5$ independently of one another are methyl or ethyl.

15. The method according to any of embodiments 9 to 14, wherein the ammonium structural units conform to the formula (IV)

  (IV)

16. The method according to any of embodiments 9 to 15, in which the average degree of substitution S, which is calculated in accordance with equation (A):

$$S = N_{Am}/N_{Sac} \quad (A)$$

in which
$N_{Am}$ stands for the total formed by adding the average number of amino structural units per polysaccharide molecule to the average number of ammonium structural units per polysaccharide molecule; and
$N_{Sac}$ stands for the average number of monosaccharide structural units per polysaccharide molecule;
is from 0.01 to 0.5, preferably 0.1 to 0.4, and more particularly 0.2 to 0.3.

17. The method according to any of embodiments 4 to 16, wherein the aqueous dispersion comprises 1 to 60 wt %, preferably 5 to 50 wt %, more particularly 10 to 45 wt %, of ketene dimer, based on the total weight of the dispersion.

18. The method according to any of embodiments 4 to 17, wherein the aqueous dispersion comprises 1 to 15 wt %, preferably 2 to 15 wt %, more particularly 3 to 15 wt %, of protective colloid, based on the overall solids content of the dispersion.

19. The method according to any of embodiments 4 to 18, wherein the aqueous ketene dimer dispersion comprises aluminium sulfate.

20. The method according to embodiment 19, wherein the aqueous ketene dimer dispersion comprises 0.1 to 10 wt %, preferably 0.1 to 7.5 wt %, and in particular 0.2 to 5 wt % of aluminium sulfate, based on the ketene dimer.

21. The method according to any of embodiments 4 to 20, wherein the aqueous dispersion comprises a dispersing agent.

22. The method according to embodiment 21, wherein the dispersing agent is lignosulfonic acid and/or a condensation product of naphthalenesulfonic acid and formaldehyde and/or a condensation product of phenolsulfonic acid and formaldehyde, wherein the sulfonic acid groups may optionally be present in protonated or deprotonated or partly in protonated and partly in deprotonated form.

23. The method according to embodiment 21 or 22, wherein the aqueous ketene dimer dispersion comprises 0.1 to 10 wt %, preferably 0.5 to 8 wt %, more preferably 1 to 5 wt % of dispersing agent, based on the overall solids content of the dispersion.

24. The method according to any of embodiments 4 to 23, wherein the aqueous ketene dimer dispersion has a pH in the range from 3 to 9, preferably 4 to 9, in particular 5 to 9.

25. The method according to any of embodiments 4 to 24, wherein the disperse phase of the aqueous ketene dimer dispersion has an average diameter of <10 μm, preferably <5 μm, more preferably <3 μm and in particular <2 μm, with the lower limit being 0.5 μm.

26. The method according to any of embodiments 4 to 25, wherein the aqueous ketene dimer dispersion comprises an organic solvent.

27. The method according to any of the preceding embodiments, wherein the ketene dimer is used in an amount of 0.02 to 8, preferably 0.1 to 5, more particularly 0.2 to 3 wt %, based on the mass of gypsum hemihydrate or anhydrite.

28. The method according to any of the preceding embodiments, wherein one or more additives are additionally added which are selected from cellulose ethers, slaked lime, mineral additives, low-density aggregates, fibers, fiber-containing components, starch, modified starch, accelerators, thickeners, retarders, air entrainers, foaming agents, antifoam additives, swelling agents, fillers, polyacrylates, dispersants, plasticizers, superabsorbents, and stabilizers.

29. The method according to embodiment 28, wherein the one or more additives are selected from fibers and fiber-containing components.

30. The method according to embodiment 28 or 29, wherein the additive(s) is (are) added during or after step (a).

31. The method according to any of the preceding embodiments, wherein the gypsum hemihydrate or anhydrite is selected from α-hemihydrate, α/β-hemihydrate, β-hemihydrate, anhydrite obtained from flue gas desulfurization or natural source, natural anhydrite, synthetic anhydrite and/or mixtures of two or more thereof.

32. The method according to embodiment 31, wherein the gypsum is selected from β-hemihydrate, anhydrite obtained from flue gas desulfurization or natural source, and/or mixtures thereof.

33. The method according to any of the preceding embodiments, wherein an aqueous foam having a density from 50 to 300 g/l, preferably 60 to 250 g/l, is used.

34. The method according to any of the preceding embodiments, wherein a surfactant-based, preferably an anionic, non-ionic or amphoteric surfactant-based aqueous foam is used and/or mixtures thereof.

35. The method according to embodiment 34, wherein an aqueous foam based on $C_6$-$C_{20}$ alkylsulfate or $C_6$-$C_{20}$ alkylethersulfate is used.

36. The method according to any of the preceding embodiments, wherein the amount of foam is such that the amount of surfactant is ≤2 g, preferably 0.01 to 1 g, per kg gypsum hemihydrate or anhydrite.

37. The method according to any of the preceding embodiments, wherein the gypsum containing foamed prefabricated building material has a core density of 0.4 to 1.1, preferably 0.4 to 0.9 and more preferably 0.5 to 0.8 kg/dm³.

38. The method according to any of the preceding embodiments, wherein the gypsum hemihydrate or anhydrite treated with the ketene dimer is subjected to a heat treatment.

39. The method according to embodiment 38, wherein the heat treatment takes place at a temperature in the range from 40 to 110° C., more particularly 50 to 100° C., and preferably 60 to 90° C.

40. The method according to any of the preceding embodiments, wherein the gypsum hemihydrate or anhydrite is admixed with the ketene dimer or a part thereof and the aqueous foam is added to the mixture.

41. The method according to any of claims 1 to 39, wherein the gypsum hemihydrate or anhydrite is admixed with the aqueous foam or a part thereof and the ketene dimer is added to the mixture.

42. A gypsum-containing foamed prefabricated building material comprising a foamed gypsum body hydrophobized with an alkylketene dimer of the formula (I) and/or of fthe formula (II) as defined in any one of claims 1 to 3.

43. A gypsum-containing foamed prefabricated building material obtainable by the method according to any one of embodiments 1 to 41.

44. The building material of embodiment 42 or 43, wherein the gypsum body has a core density of 0.4 to 1.1, preferably 0.4 to 0.9 and more preferably 0.5 to 0.8 kg/dm³.

45. The prefabricated building material according to any one of embodiment 42 to 44, which is selected from panels, rods, and pipes.

46. The prefabricated building material according to embodiment 45, which is selected from gypsum plasterboard panels, gypsum fiberboard panels, gypsum-containing wallboarding panels, sheathing products and gypsum-containing moldings.

47. The prefabricated building material according to any one of embodiments 42 to 46, which comprises fibers or a fiber-containing component.

48. The prefabricated building material according to embodiment 47, wherein the fiber-containing component is a paper, glass fibers, a woven or non-woven glass or a card.

49. The prefabricated building material according to embodiment 48, wherein the fiber-containing component is present on at least one of the surfaces of the prefabricated building material or incorporated parallel to at least one of the surfaces into the prefabricated building material.

50. The prefabricated building material according to any of embodiments 47 to 49, wherein the fiber-containing component comprises macroscopic fibers in netlike disposition or microscopic fibers in sheet-like distribution.

51. The prefabricated building material according to any of embodiments 47 to 50, wherein the fibers are cellulose fibers and the fiber-containing component comprises cellulose fibers.

The invention relates to a method for producing a gypsum-containing foamed prefabricated building material comprising the step of (a) preparing a mixture of gypsum hemihydrate or anhydrite, a ketene dimer of the formula (I)

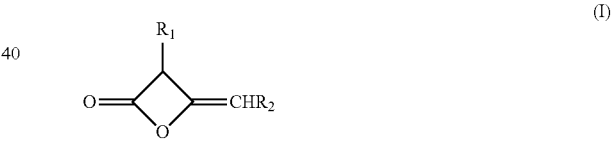

and/or the formula (II)

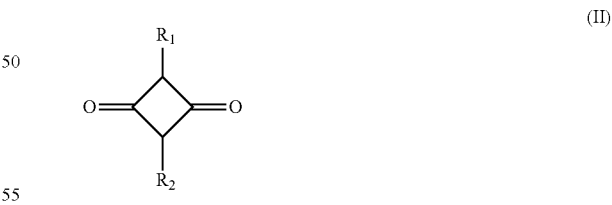

in which $R_1$ and $R_2$ are identical or different hydrocarbon radicals comprising 10 to 24 carbon atoms, and an aqueous foam to obtain a gypsum composition; and (b) forming, optionally curing and drying the gypsum composition to obtain the foamed prefabricated building material.

The hydrocarbon radicals are selected preferably from branched and unbranched $C_{12}$-$C_{24}$-alkyl or $C_{12}$-$C_{24}$-alkenyl; more preferably from branched and unbranched $C_{12}$-$C_{24}$-alkyl; and very preferably from branched and unbranched $C_{14}$-$C_{20}$-alkyl. With very particular preference the hydrocarbon radicals are selected from branched and unbranched $C_{14}-$, $C_{15}-$, $C_{16}-$, and $C_{18}$-alkyl. By "alkenyl" are meant branched and unbranched, ethylenically unsaturated aliphatic hydrocarbons having one, two, or three double bonds.

"Gypsum hemihydrate or anhydrite" is a calcium sulfate-containing binder which is capable of forming calcium sulfate dihydrate. The gypsum hemihydrate or anhydrite contains at least 65 wt. %, preferably, at least 80 wt. %, in particular at least 90 and especially at least 95 wt. %, of hemihydrate or anhydrite with the remainder being calcium sulfate dihydrate and/impurities depending on the origin of the hemihydrate or anhydrite. The hemihydrate or anhydrite is selected more particularly from α-hemihydrate, α/β-hemihydrate, β-hemihydrate (β-hemihydrate which is synthetic or obtained from natural sources), natural anhydrite, synthetic anhydrite, anhydrite obtained from flue gas desulfurization, and/or mixtures of two or more thereof; preferably from β-hemihydrate (more particularly β-hemihydrate obtained from natural sources), anhydrite obtained from flue gas desulfurization, and/or mixtures thereof. The term "gypsum" also refers here, however, to the dihydrate, since the alkyl ketene dimer can also be applied, for imparting water repellency, to the surface of gypsum that has already set. The term "gypsum" also refers here to a mixture of the calcium sulfate-containing binder with other components, more particularly components for the production of gypsum-containing ready-made structural components.

"Hydrophobized" as used herein means that the water uptake of a gypsum-based material is 25%, preferably ≤10% and more preferably ≤5%, in accordance to DIN EN 520.

The gypsum hemihydrate or anhydrite is preferably admixed with the ketene dimer in the presence of water. With particular preference the ketene dimer is in the form of an aqueous dispersion, also referred to below as ketene dimer dispersion. The gypsum hemihydrate or anhydrite may be contacted in solid form or in the form of an aqueous suspension with the ketene dimer dispersion. The gypsum hemihydrate or anhydrite is usefully mixed in solid form with the ketene dimer suspension, being introduced into the aqueous ketene dimer dispersion, for example. If the gypsum hemihydrate or anhydrite is employed in the form of an aqueous suspension, the ketene dimer dispersion is usefully introduced into the gypsum suspension. This introduction of the ketene dimer dispersion takes place within a period of up to one minute after the preparation of the gypsum hemihydrate or anhydrite suspension. The amounts of water are selected such that contacting of ketene dimer and gypsum produces a ready-to-use gypsum slurry which at this stage contains at least in part gypsum dihydrate. In order to ensure uniform distribution of the ketene dimer in the gypsum, homogenization takes place using customary apparatus, as for example stirring apparatus, such as Hobart mixers.

The ketene dimer is obtained by dimerization of ketenes. The ketenes are prepared, for example, by reaction of carbonyl chlorides with tertiary amines. Of particular technical importance are carbonyl chlorides which are obtainable by chlorination of naturally occurring fatty acids or mixtures thereof, examples being acid chlorides based on fatty acids got from coconut oil, tall oil, castor oil, olive oil, bovine tallow, or palm kernel oil. Typical examples of carbonyl chlorides are myristoyl chloride, palmitoyl chloride, stearoyl chloride, oleoyl chloride, behenoyl chloride, and isostearoyl chloride. The reaction of the carbonyl chlorides with the tertiary amines is conducted with particular advantage in the absence of solvents, with thorough mixing, at temperatures of 65 to 150° C. in accordance with the method known from EP-A 1 453 821.

The ketene dimer dispersion of the invention is stabilized by a dispersant, preferably by a protective colloid. The protective colloid may be nonionic, anionic, cationic, or amphoteric, and is selected more particularly from synthetic, natural, and modified natural polymers.

Examples of suitable nonionic protective colloids are polyvinyl alcohol, polyvinylpyrrolidone and copolymers containing vinylpyrrolidon, hydroxypropylcellulose, or hydroxypropylmethylcellulose, etc. A list of suitable protective colloids is published in Houben-Weyl, Methoden der organischen Chemie, Band XIV/1, Makromolekulare Stoffe, Georg-Thieme-Verlag, Stuttgart, 1961, S. 411 bis 420.

Examples of suitable anionic protective colloids are polyacrylates, polycarboxylic ethers, polyphosphate ethers, ketone resins, carboxymethylcellulose, pectins, alginates, condensation products of naphthalene sulfonic acid and formaldehyde or a salt of naphthalene sulfonic acid, melamine sulfonic acid, ethoxylated phenyl phosphate acids and formaldehyde and/or lignosulfonic acid or a salt of lignosulfonic acid.

Examples of suitable amphoteric protective colloids are proteins, such as gelatine.

Examples of cationic protective colloids are polyvinylamines, polydiallyldimethylammonium chloride, copolymers of acrylamide and trimethylammonioethyl acrylate, poly(benzyldimethylammonioethyl methacrylate), and cationic polysaccharides, such as cationic starches and cationic celluloses. Preferred polysaccharides are those modified by ammonium structural units. Employed with particular preference are the aforementioned nonionic or anionic protective colloids. Preferred cationic protective colloids are starch or cellulose which is modified by ammonium structural units and is referred to below as cationic starch or cationic cellulose. Cationic starch and cationic cellulose contemplated comprises all water-soluble starches and water-soluble celluloses that have an amino group and/or ammonium group as cationic group. Such starches are available commercially. They are obtained, for example, by reaction of native starch with compounds which have tertiary or quaternary nitrogen atoms, such as alkylaminoalkyl epoxides or alkylaminoalkyl chlorides. Examples of such compounds are 3-chloro-2-hydroxypropyltrimethylammonium chloride and glycidyltrimethylammonium chloride.

Preferred cationic starches have ammonium structural units which are identical or different and conform to the formula (IIIa) and/or the formula (IIIb)

(IIIa)

(IIIb)

in which

A is branched or unbranched $C_1$-$C_4$-alkylene which is optionally substituted by one or more hydroxyl or phenyl groups; or A is $C_1$-$C_3$-alkylene-phenylene, phenylene-$C_1$-$C_3$-alkylene, or $C_1$-$C_3$-alkylene-phenylene-$C_1$-$C_3$-alkylene which is optionally substituted by one or more hydroxyl groups; and $R^3$, $R^4$, and $R^5$ independently of one another are branched or unbranched $C_1$-$C_4$-alkyl or $C_2$-$C_4$-hydroxyalkyl, it also being possible for $R^5$ to be H.

Preference is given to the ammonium structural units which are identical or different and conform to the formula (IIIb) in which A is —CH$_2$—CHOH—CH$_2$—, —CH$_2$—CH(CH$_2$OH)—, or —CH$_2$—CH$_2$—; and R$^3$, R$^4$, and R$^5$ independently of one another are methyl or ethyl.

In one preferred embodiment the ammonium structural units conform to the formula (IV).

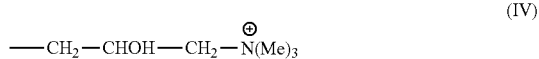

(IV)

A cationic starch or cationic cellulose may also be a cationized degraded starch or cellulose. The latter are obtainable by subjecting a native starch or cellulose first to a degradation procedure in order to reduce the molecular weight of the starch or cellulose, and then cationizing the degraded starch or cellulose. The degradation may take place oxidatively, thermally, hydrolytically and/or enzymatically.

The degree of cationization of the starch or cellulose is expressed for example with the aid of the degree of substitution (S). This is calculated according to equation (A)

$$S = N_{Am}/N_{Sac} \quad (A)$$

in which

N$_{Am}$ stands for the total formed by adding the average number of amino structural units per polysaccharide molecule to the average number of ammonium structural units per polysaccharide molecule; and N$_{Sac}$ stands for the average number of monosaccharide structural units per polysaccharide molecule.

The degree of substitution of the cationic starch is preferably 0.01 to 0.5 and more preferably in the range from 0.02 to 0.4. Cationic starches used with preference have a degree of substitution of at least 0.08, more particularly 0.08 to 0.5, 0.08 to 0.4, or 0.08 to 0.3.

A suitable basis for cationic starches comprises, for example, starches from potatoes, tapioca, rice, wheat, corn, sorghum, and peas. The amylopectin content of starches may amount for example to 0.1% to 100%. One example of a cationic starch is Percole® 134 EP, with a degree of substitution of 0.17. Particularly preferred is cationic potato starch which is modified with a tertiary amine or with a quaternary amine and has a viscosity of 50 to 200 mPas (measured in a Brookfield viscometer at a temperature of 20° C., spindle 2, with a solids content of 3.0%).

Preferred are protective colloids, in particular starches and modified starches, which have a viscosity from about 5 to about 1000 mPas in a 10% w/w aqueous solutions.

In the embodiments in which the ketene dimer is employed as an aqueous dispersion, the aqueous dispersion preferably comprising 1 to 60 wt %, more particularly 5 to 50 wt %, and more preferably 10 to 45 wt %, of ketene dimer. The aqueous ketene dispersion preferably further comprises 0.1 to 10 wt %, more preferably 0.1 to 7.5 wt % and in particular 0.2 to 5 wt % of aluminium sulfate, based on the ketene dimer. The aqueous dispersion preferably further comprises a dispersing agent which is preferably lignosulfonic acid and/or a condensation product of naphthalenesulfonic acid and formaldehyde and/or a condensation product of phenolsulfonic acid and formaldehyde. The sulfonic acid groups may be present in protonated or deprotonated or partly in protonated and partly in deprotonated form. The dispersing agent is in general present in an amount of 0.1 to 5 wt %, preferably 0.5 to 4 wt % and in particular 1 to 3 wt %.

The aqueous ketene dispersion preferably has a pH of 3 to 9, preferably 5 to 9.

The aqueous ketene dispersions which comprise aluminum sulfate preferably also comprise at least one acid selected from saturated C$_1$-C$_{10}$ carboxylic acids, benzenesulfonic acid, p-toluenesulfonic acid, and mineral acids (H$_2$SO$_4$, H$_3$PO$_4$). The acid is preferably present in an amount of 0.5 to 5 wt %, based on the ketene dimer.

The ketene dimer dispersions optionally comprise, based in each case on the ketene dimer, (a) 0.1 to 10 wt % of aluminum sulfate, and/or (b) 1 to 15 wt % of at least one water-soluble cationic starch, and/or (c) 0.1 to 5 wt % of at least one condensation product of naphthalenesulfonic acid and formaldehyde or a salt of naphthalene sulfonic acid and formaldehyde and/or lignosulfonic acid or a salt of lignosulfonic acid, and/or (d) 0.5 to 5 wt % of at least one saturated carboxylic acid having 1 to 10 C atoms, benzenesulfonic acid, p-toluenesulfonic acid and/or a mineral acid (H$_2$SO$_4$, H$_3$PO$_4$).

The disperse phase of the ketene dispersions generally has an average diameter of less than 10 μm, more particularly less than 5 μm, preferably less than 2 μm, more preferably less than 1 μm, very preferably less than 0.5 μm. In accordance with one of the following embodiments, the disperse phase of the ketene dispersions has an average diameter in the range from 0.5 to 10 μm, 0.5 to 5 μm, 1 to 10 μm, or 1 to 5 μm. The ketene dimer dispersion sizes reported here are weight-average sizes of the kind ascertainable by dynamic light scattering. Methods for doing this are familiar to the skilled person from—for example—H. Wiese in D. Distler, Wäassrige Polymerdispersionen, Wiley-VCH 1999, section 4.2.1, p. 40ff and literature cited therein, and also H. Auweter, D. Horn, J. Colloid Interf. Sci. 105 (1985) 399, D. Lilge, D. Horn, Colloid Polym. Sci. 269 (1991) 704, or H. Wiese, D. Horn, J. Chem. Phys. 94 (1991) 6429.

The ketene dimers used have a melting point of approximately 45-70° C. Depending on temperature, therefore, the disperse phase may be present at least partly in liquid form. It is advantageous if the ketene dimers, following incorporation into the gypsum hemihydrate or anhydrite, as for example during the drying thereof, are exposed briefly (1 to 60 minutes) to a temperature above the melting point of the ketene dimer, and cool down again. In general the heat treatment takes place at a temperature in the range from 40 to 110° C., more particularly 50 to 100° C., and preferably 60 to 90° C.

It is preferred to use 0.02 to 8, preferably 0.1 to 5, more particularly 0.2 to 3 wt %, very preferably 0.5 to 2.5 wt %, of the ketene dimer, based on the mass of the dry gypsum hemihydrate or anhydrite.

In accordance with the invention the gypsum or the gypsum hemihydrate or anhydrite may comprise one or more components (additives) selected from cellulose ethers, such as methylhydroxypropylcellulose; slaked lime; mineral additives such as silica sand, limestone sand, limestone pebble, finely ground limestone, and clay minerals, such as mica, kaolinite, chrysoile, illite, smectite, vermiculite, talc, montmorillonite, hectorite, or saponite; low-density aggregates, such as perlite; fibers, such as cellulose fibers; fiber-containing components; accelerators, such as finely ground calcium sulfate dihydrate; thickeners such as starch and starch derivatives, guar derivatives, synthetic thickeners, polyacrylamides, and polyvinyl alcohols; retarders, such as a calcium salt of an N-polyoxymethylene-amino acid (Retardan P from Sika AG); air entrainers, such as fatty acids, alkyl sulfates, and phenyl ethoxylates; foaming agents, such as fatty alkyl sulfates and fatty alkyl ether sulfates; antifoam additives, such as silicones; swelling agents, such as phyllosilicates; polyacrylates; plasticizers, such as lignosulfonates, β-naphthalenesulfonates, melamine resins, phosphate- or phosphonate-containing structures, and polycarboxylate ethers; and stabilizers, such as starch and cellulose ethers. Said additives may be added at any time during or after step (a).

In the production of gypsum-containing foamed prefabricated building material, preferably fibers or a fiber-containing component may be included in the processing procedure. The fibers in question may be plant fibers, such as cellulose fibers, glass fibers, plastics fibers, mineral fibers, or metal fibers. The fiber-containing component may comprise sheetlike parts, such as card or paper. During the production of the gypsum-containing ready-made structural component, the fiber-containing component is generally applied at least to one of the surfaces or incorporated parallel to at least one of the surfaces. For this purpose the gypsum-containing composition of the invention may be applied to the fiber-containing component. In that case a fiber-containing component comprising microscopic fibers in sheetlike distribution is preferably used. A fiber-containing component of this kind may consist predominantly of paper or card, for example. The surfaces of the fiber-containing component may be pretreated before the gypsum is applied. It is preferred for a second fiber-containing component to be applied to the gypsum-containing composition which is applied to the fiber-containing component. In this way a three-ply layer is obtained, as in gypsum plasterboard panels, for example.

Alternatively the fiber-containing component can be incorporated in sheetlike manner into a gypsum-containing composition of the invention. In that case the fiber-containing component used preferably comprises macroscopic fibers in netlike disposition. A fiber-containing component of this kind may be constructed predominantly from cellulose fibers or glass fibers, for example. In this way a reinforced gypsum layer can be obtained, such as in gypsum fiberboard panels, for example.

Further, hydrophobized fibers or fiber-containing components may be used.

In step (a) a foam is added. Preferably, the foam is a surfactant based foam and in particular an anionic surfactant-based foam. Suitable surfactants are $C_{12}$-$C_{20}$ alkylsulfates, $C_{12}$-$C_{20}$ alkylethersulfates, amphoteric surfactants (betaines), alkylpolyglycosides etc. the foam is prepared in a conventional manner, for example by means of a foam generator such as a rotor-stator system.

Preferably, a foam having a density of 50 to 300 g/l, preferably 60 to 250 g/l is used. The quantity of foam added is such that the prefabricated building material has a core density of <1.10 kg/dm³, preferably <0.90 kg/dm³, and in particular <0.80 kg/dm³. According to an embodiment, the core density is 0.4 to 1.1, preferably 0.4 to 0.9 and more preferably 0.5 to 0.8 kg/dm³. The production of a foamed prefabricated building material having a core density as indicated above is achieved by adding foam in a quantity such that the ratio of surfactant to gypsum hemihydrate or anhydrite is below 2.0 g, preferably 0.01 to 2.0 g surfactant per kg gypsum hemihydrate or anhydrite.

The components contained in the gypsum composition of step (a) may be admixed in any order, i.e. simultaneously or one after the other, each partly or completely. Preferably, the gypsum hemihydrate or anhydrite is admixed with the ketene dimer or a part thereof and the aqueous foam is added to the mixture. According to another embodiment, the gypsum hemihydrate or anhydrite is admixed with the aqueous foam or a part thereof and the ketene dimer is added to the mixture.

In step (b) the gypsum composition is subjected to conventional processing steps, in particular forming the composition (slurry) to the desired shape and drying it. The curing process already starts during step (a) and continues during shaping and drying. If desired, the curing process can be completed prior to drying the prefabricated building material. The foamed prefabricated building materials are dried, typically in a drying tunnel, at gypsum core temperatures in the range from 40 to 100° C., more particularly in the range from 60° C. to 90° C.

The present invention also relates to a gypsum-containing foamed prefabricated building material (ready-made structural components) obtainable by the method of the invention.

The following examples illustrate the invention without limiting it.

EXAMPLE 1

A fatty alkyl sulfate-based foam was produced as follows:
A 0.3% strength surfactant solution (based on lauryl sulfate) was converted into foam in a foam generator by rotation of a stator-rotor system and with addition of compressed air. The foam density achieved was 75 g/L.

Test specimens were prepared using the following dispersions of the hydrophobizing agents:

Sasol Hydrowax 170 (comparative dispersion):
Hydrowax 170 from Sasol is a special dispersion available commercially (solids content approximately 37%) for hydrophobization of gypsum plasterboard panels, and comprises mutually aligned waxes (including paraffin wax) and emulsifiers, and is silicone-free.

AKD Dispersion I (According to the Invention):
Aqueous dispersion of a $C_{16}$/$C_{18}$ (50:50) alkylketene dimer dispersed with 3 wt % of a cationically modified starch (in formula I and II: $R^1$ and $R^2$ are $C_{14}$ and $C_{16}$ alkyl, respectively). The average particle diameter is about 1000 nm. The total solids content is about 24%.

AKD dispersion II (according to the invention):
Aqueous dispersion of a $C_{16}$/$C_{18}$ (20:80) alkylketene dimer dispersed with 3 wt % of a cationically modified starch (in formula I and II: $R^1$ and $R^2$ are $C_{14}$ and $C_{16}$ alkyl, respectively). The average particle diameter is about 1000 nm. The total solids content is about 18%.

The dispersion of the hydrophobizing agent was diluted with water in a vessel and homogenized to form a liquid component, to give the amounts of hydrophobizing agent indicated in table 1 below in 480 g of water—in other words, the water present in the hydrophobizing agent dispersion was included in the calculation. β-Hemihydrate (600 g) obtained in flue gas desulfurization was subjected to preliminary homogenization with 0.13 g of finely ground calcium sulfate dihydrate (accelerator for setting a solidification time of about 2.5 minutes) in a mixer to give a dry component. The dry component was sprinkled into the liquid component. After standing for 15 seconds, the resulting gypsum slurry was stirred using a Hobart mixer at setting II (285 revolutions per minute) for 30 seconds, and during this stirring time the fatty alkyl sulfate-based foam (20.4 g with a density of 75 g/L) was admixed. The density of the resulting gypsum slurry was 1050+/−10 kg/m³. Filling of a cylindrical plastic beaker with a height of 10 cm and a diameter of 8 cm with a portion of the gypsum slurry was followed by curing and drying to form a specimen having a height of about 2 cm. After the specimen has hardened (storage at 20° C. for 15 minutes) it is removed from the plastic mold and dried at 100° C. for 60 minutes and then at around 40° C. to constant mass. The mass of the specimen ($M_D$) was ascertained by weighing. For the measurement of the water adsorption, the specimen was stored in a water bath at a set temperature of 20° C. The fill level of the water bath was set such that the highest point on the specimen was covered by 3 cm of water. After water bath storage for two hours, the specimen was removed from the water bath, and excess water was removed using a cloth. The mass of the specimen ($M_W$) was ascertained again by weighing, and the water uptake W in % was determined in accordance with the following formula:

$$W=100\%\times((M_W-M_D)/M_D)$$

TABLE 1

Water uptake of specimens following addition of different hydrophobizing agents and different amounts of hydrophobizing agent according to example 1.

| Hydrophobizing agent: (Metering in mass % based on β-hemihydrate) | Sasol Hydrowax 170 | AKD dispersion I | AKD dispersion II |
|---|---|---|---|
| 0 | 54.2% | 54.2% | 54.2% |
| 1.0 | 19.1% | 8.4% | 5.0% |
| 1.2 | 10.1% | 3.8% | 2.9% |
| 1.5 | 4.9% | 0.5% | 0.4% |
| 2.0 | 0.5% | 0.3% | 0.3% |

From table 1 it is evident that for a water uptake of less than 5 wt % it is necessary to add about 1.5 wt % of the wax emulsion (Sasol Hydrowax 170), whereas for the two inventive examples (AD dispersion I and II) this figure is already achieved with an addition of less than 1.2 wt %.

EXAMPLE 2

Comparative Experiment 2.1:

3.0 g of the plasticizer Melflux PCE 1493 L from BASF (40% strength polycarboxylate ether solution for reducing the water/gypsum ratio), 600 g of gypsum (β-hemihydrate obtained from flue gas desulfurization), and 1.3 g of accelerator (finely ground calcium sulfate dihydrate for setting a solidification time of about 2.5 minutes) were introduced into 367.5 g of water and the mixture was left at rest for 15 seconds. The Hobart mixer was then used on setting II (285 revolutions per minute) for 30 seconds, and during this stirring time the fatty alkyl sulfate-based foam (38.6 g with a density of 75 g/L) was admixed, until the density of the resulting gypsum slurry was 955+/−10 kg/m³.

Comparative Experiment 2.2:

A diluted wax emulsion was prepared by weighing out 32.4 g of the 37% wax emulsion (Sasol Hydrowax 170) into 347 g of water. This corresponds to 2 mass % of wax solid, based on gypsum. Then 3.0 g of Melflux PCE 1493 L (from BASF), 600 g of gypsum (β-hemihydrate obtained from flue gas desulfurization), and 1.3 g of accelerator (finely ground calcium sulfate dihydrate for setting a solidification time of about 2.5 minutes) were introduced into the diluted wax emulsion, and the mixture was left at rest for 15 seconds. The Hobart mixer was then used on setting II (285 revolutions per minute) for 30 seconds, and during this stirring time the fatty alkyl sulfate-based foam (38.6 g with a density of 75 g/L) was admixed, until the resulting gypsum slurry had a density of 955+/−10 kg/m³.

Experiment 2.3:

A diluted AKD dispersion was prepared by weighing out 33.3 g of the 18% AKD dispersion I into 340.1 g of water. This corresponds to 1 mass % of AKD solid, based on gypsum. Then 3.0 g of Melflux PCE 1493 L (from BASF), 600 g of gypsum (β-hemihydrate obtained from flue gas desulfurization), and 1.3 g of accelerator (finely ground calcium sulfate dihydrate for setting a solidification time of about 2.5 minutes) were introduced into the aqueous AKD dipersion, and the mixture was left at rest for 15 seconds. The Hobart mixer was then used on setting II (285 revolutions per minute) for 30 seconds, and during this stirring time the fatty alkyl sulfate-based foam (38.6 g with a density of 75 g/L) was admixed, until the resulting gypsum slurry had a density of 955+/−10 kg/m³. The production of specimens from the plaster slurry, the investigation of the water absorption, and the calculation of the water uptake took place, in the experiments and comparative experiments of example 2, in the manner described in example 1.

The water uptake of specimens of comparative experiment 2.1 was 34.2%. The water uptake of specimens of comparative experiment 2.2 was 27.8%. The water uptake of specimens of inventive experiment 2.3 was 9.6%.

EXAMPLE 3

A fatty alkyl ether sulfate-based foam was prepared as described in example 1.

Comparative Experiment 3.1:

3.0 g of Melflux PCE 1493 L (from BASF), 600 g of gypsum (β-hemihydrate obtained from flue gas desulfurization), and 1.0 g of accelerator (finely ground calcium sulfate dihydrate for setting a solidification time of about 2.5 minutes) were introduced into 354.7 g of water and the mixture was left at rest for 15 seconds. The Hobart mixer was then used on setting II (285 revolutions per minute) for 30 seconds, and during this stirring time the fatty alkyl ether sulfate-based foam (36.5 g with a density of 75 g/L) was admixed, until the density of the resulting gypsum slurry was 970+/−20 kg/m³.

Experiment 3.2:

A diluted AKD dispersion II was prepared by weighing out 24.0 g of the 25% AKD dispersion II into 336.7 g of water. Then 3.0 g of Melflux PCE 1493 L (from BASF), 600 g of gypsum (β-hemihydrate obtained from flue gas desulfurization), and 0.9 g of accelerator (finely ground calcium sulfate dihydrate for setting a solidification time of about 2.5 minutes) were introduced into the diluted AKD dispersion II, and the mixture was left at rest for 15 seconds. The Hobart mixer was then used on setting II (285 revolutions per minute) for 30 seconds, and during this stirring time the fatty alkyl ether sulfate-based foam (36.5 g with a density of 75 g/L) was admixed, until the resulting gypsum slurry had a density of 970+/−20 kg/m³.

In comparative experiment 3.1 and in experiment 3.2, one minute after the beginning of stirring in the Hobart mixer, determinations were made of the slump flow (table 2), and 4×4×16 cm³ prisms were produced for strength investigation (in accordance with DIN 196-1). The prisms were first stored in open steel molds for 24 hours at 20° C./65% relative humidity. After 24 hours they were demolded, dried to constant mass as indicated in example 1, and then subjected to the flexural tensile and pressure tests. The solidification time was measured using the knife cut method (in accordance with DIN EN 13279-2).

TABLE 2

Slump flows, solidification times and strength values of foamed prisms of example 3.

| Parameter | Comparative experiment 3.1 | Experiment 3.2 |
|---|---|---|
| Slump flow [cm] | 18.2 | 18.5 |
| Solidification time [min:s] | 2:35 | 2:40 |
| Flexural tensile strength [N/mm$^2$] | 1.75 | 2.03 |
| Compressive strength [N/mm$^2$] | 3.74 | 4.23 |

Example 3 shows that with densities, slump flows, and solidification times that are set the same, the strength values can also be increased by addition of AKD dispersion. At a level of addition of one percent AKD dispersion, not only the flexural tensile strength but also the compressive strength rose by more than 10% in comparison to the reference mixture.

The invention claimed is:

1. A method for producing a gypsum-containing foamed prefabricated building material core, comprising:
    (a) preparing a mixture of gypsum hemihydrate or anhydrite with at least one of a ketene dimer of formula (I)

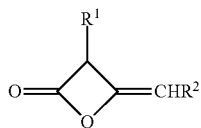
(I)

or of formula (II)

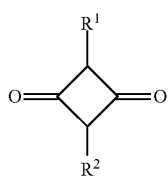
(II)

wherein $R^1$ and $R^2$ are identical or different hydrocarbon radicals comprising 10 to 24 carbon atoms,
    (b) homogenizing the aqueous ketene gypsum hemihydrate or anhydrite mixture to obtain a uniform distribution of the ketene in the gypsum hemihydrate or anhydrite,
    (c) adding an aqueous foam having a density of from 50 to 300 g/l to the homogenized aqueous mixture of the ketene and gypsum hemihydrate or anhydrite to obtain a gypsum composition; and
    (d) forming, optionally curing and drying the gypsum composition to obtain the foamed prefabricated building material gypsum core comprising the ketene dimer of formula (I) or Formula (II),
wherein
    a content of surfactant in the aqueous foam is from 0.01 to 2 g per kg of gypsum hemihydrate or anhydrite in the homogenized aqueous mixture of the ketene and gypsum hemihydrate or anhydrite, and
    a density of the foamed prefabricated building material gypsum core obtained is from 0.4 to 1.1 kg/dm$^3$.

2. The method according to claim 1, wherein the ketene dimer is employed in the form of an aqueous dispersion.

3. The method according to claim 2, wherein the gypsum hemihydrate or anhydrite is used in solid form or in the form of an aqueous suspension.

4. The method according to claim 2, wherein the aqueous ketene dispersion is stabilized by a protective colloid.

5. The method according to claim 4, wherein the protective colloid is a starch, a cellulose or a cellulose modified by ammonium structural units.

6. The method according to claim 2, wherein the aqueous ketene dispersion comprises 1 to 60 wt % of ketene dimer, based on the total weight of the dispersion.

7. The method according to claim 2, wherein the disperse phase of the aqueous ketene dispersion has an average diameter of less than 10 µm.

8. The method according to claim 1, wherein 0.02 to 8.0 wt % of the ketene dimer, based on the mass of the gypsum hemihydrate or anhydrite, is used.

9. The method according to claim 1, wherein the gypsum hemihydrate or anhydrite is selected from the group consisting of α-hemihydrate, α/β-hemihydrate, β-hemihydrate, natural anhydrite, synthetic anhydrite and anhydrite obtained from flue gas desulfurization, and mixtures thereof.

10. The method according to claim 1, wherein the aqueous foam comprises a fatty alkylsulfate or fatty alkylethersulfate.

* * * * *

UNITED STATES PATENT AND TRADEMARK OFFICE
CERTIFICATE OF CORRECTION

PATENT NO. : 10,464,851 B2
APPLICATION NO. : 14/763025
DATED : November 5, 2019
INVENTOR(S) : Uwe Gehrig et al.

It is certified that error appears in the above-identified patent and that said Letters Patent is hereby corrected as shown below:

In the Specification

In Column 5, Line 63, delete "fthe" and insert -- the --, therefor.

In Column 8, Line 8 (approx.), delete "vinylpyrrolidon," and insert -- vinylpyrrolidone, --, therefor.

In Column 10, Line 62, delete "chrysoile," and insert -- chrysotile, --, therefor.

In Column 14, Line 14, delete "dipersion," and insert -- dispersion, --, therefor.

Signed and Sealed this
Twelfth Day of May, 2020

Andrei Iancu
*Director of the United States Patent and Trademark Office*